(12) United States Patent
Swift et al.

(10) Patent No.: US 9,027,230 B2
(45) Date of Patent: May 12, 2015

(54) THERMALLY RESPONSIVE COMPOSITE MEMBER, RELATED DEVICES, AND APPLICATIONS INCLUDING STRUCTURAL APPLICATIONS

(75) Inventors: Joseph A. Swift, Ontario, NY (US);
Stanley J. Wallace, Victor, NY (US);
Roger Bullock, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 604 days.

(21) Appl. No.: 12/395,942

(22) Filed: Mar. 2, 2009

(65) Prior Publication Data
US 2010/0221517 A1    Sep. 2, 2010

(51) Int. Cl.
| | | |
|---|---|---|
| *H01C 3/00* | (2006.01) | |
| *H01C 7/00* | (2006.01) | |
| *G01K 7/18* | (2006.01) | |
| *G01K 7/22* | (2006.01) | |
| *H01C 7/04* | (2006.01) | |

(52) U.S. Cl.
CPC ............ *G01K 7/183* (2013.01); *G01K 7/223* (2013.01); *H01C 3/00* (2013.01); *H01C 7/008* (2013.01); *H01C 7/049* (2013.01)

(58) Field of Classification Search
CPC .................................................... G01K 7/183
USPC ............ 428/220, 704, 446, 423.1, 413, 447, 428/425.5; 338/22 R, 22 SD, 23, 24; 228/176; 156/273.9; 29/610.1, 611, 29/612, 621, 842, 857, 883, 884
See application file for complete search history.

(56) References Cited

U.S. PATENT DOCUMENTS

| | | | | |
|---|---|---|---|---|
| 4,200,970 A | * | 5/1980 | Schonberger | 29/593 |
| 4,480,376 A | * | 11/1984 | Hakanson | 29/593 |
| 4,795,998 A | * | 1/1989 | Dunbar et al. | 338/5 |
| 4,929,472 A | * | 5/1990 | Sugihara et al. | 427/215 |
| 4,975,302 A | * | 12/1990 | Sugihara et al. | 427/215 |
| 5,250,756 A | * | 10/1993 | Swift et al. | 174/119 R |
| 5,599,615 A | * | 2/1997 | Swift et al. | 428/293.1 |

(Continued)

FOREIGN PATENT DOCUMENTS

| | | |
|---|---|---|
| JP | H01132102 A | 5/1989 |
| JP | H07111184 A | 4/1995 |

(Continued)

OTHER PUBLICATIONS

The RTD, Published Online at Omega.com, Author Unknown, Date Unknown.*

(Continued)

*Primary Examiner* — Maria Veronica Ewald
*Assistant Examiner* — Nathan Van Sell
(74) *Attorney, Agent, or Firm* — MH2 Technology Law Group LLP (57) ABSTRACT

In accordance with the invention, there are temperature sensing and temperature control devices and methods of making them. The temperature sensing and control devices can include a composite member, the composite member including a non-metallic binder material, and one or more non-metallic, electrically conductive fibers disposed in the non-metallic binder material. The temperature sensing and control devices can also include a plurality of contacts disposed on the one or more non-metallic, electrically conductive fibers, wherein the composite member has a substantially continuous decrease in electrical resistance with an increase in temperature.

22 Claims, 9 Drawing Sheets

(56) References Cited

U.S. PATENT DOCUMENTS

| | | | |
|---|---|---|---|
| 6,311,390 B1* | 11/2001 | Abe et al. | 29/612 |
| 7,217,374 B2 | 5/2007 | Watanabe | |
| 2003/0001261 A1* | 1/2003 | Ueda et al. | 257/734 |
| 2003/0144388 A1* | 7/2003 | Swift et al. | 524/79 |
| 2004/0020918 A1* | 2/2004 | Kakihara et al. | 219/505 |
| 2005/0062582 A1* | 3/2005 | Feichtinger et al. | 338/23 |
| 2006/0269864 A1* | 11/2006 | Tarnawskyj et al. | 430/124 |
| 2006/0289463 A1* | 12/2006 | Kil | 219/505 |
| 2007/0037903 A1* | 2/2007 | Swift | 523/218 |
| 2007/0134408 A1* | 6/2007 | Skoog et al. | 427/142 |
| 2009/0165289 A1* | 7/2009 | Deng et al. | 29/612 |

FOREIGN PATENT DOCUMENTS

| | | | | |
|---|---|---|---|---|
| JP | 2002110402 A | | 4/2002 | |
| JP | 2006030030 A | * | 7/2004 | G01K 7/22 |
| JP | 2005072209 A | | 3/2005 | |

OTHER PUBLICATIONS

Derwent Abstract for JP-2006030030, Hanzawa, Feb. 2006.*

Shuichi Shitara, Summary of Japanese Office Action dated Jan. 14, 2014, Japanese Patent Application No. 2010-108030 filed Mar. 2, 2010, pp. 1-4.

* cited by examiner

THERMALLY RESPONSIVE COMPOSITE MEMBER, RELATED DEVICES, AND APPLICATIONS INCLUDING STRUCTURAL APPLICATIONS

DESCRIPTION OF THE INVENTION

1. Field of the Invention

The subject matter of this invention relates to thermally responsive materials. More particularly, the subject matter of this invention relates to temperature sensing and temperature control devices and methods of making thermal sensors and temperature controllers.

2. Background of the Invention

Thermal responsive members are used in a variety of existing devices, such as, thermistors, thermocouples, thermal sensors, and detectors for temperature sensing, monitoring, control, and display. Nearly all existing thermally responsive members have been and continue to be largely metallic, including metals, bimetallics, metal alloys, metal oxide ceramics, and metal composites. However, many of the fundamental properties that are the underpinnings of metals and metallic-behaviors, such as for example, density (or specific gravity), thermal conductivity, heat capacity, magnetic and corrosion susceptibility can cause serious limitations on performance parameters such as, thermal sensitivity, response speed, and heat draw. Further, since metals typically exhibit a positive thermal resistance coefficient (PTC materials show an increase in electrical resistance with temperature), serious limitations are further translated onto the designs of affiliated devices and related electric devices, electronics, and instrumentation. While there are thermistor devices with negative thermal coefficient (NTC) (NTC materials show an increase in thermal conductivity with temperature), they too have limitations with sensitivity, response speed, and heat draw.

Hence, there is a need for a new generation of thermally responsive members having different properties, which in turn could enable new devices, design, and application options.

SUMMARY OF THE INVENTION

In accordance with various embodiments, there is a device including a composite member. The composite member can include a non-metallic binder material, and one or more non-metallic, electrically conductive fibers disposed in the non-metallic binder material. The device can also include a plurality of contacts disposed on the one or more non-metallic, electrically conductive fibers, wherein the composite member can have a substantially continuous decrease in electrical resistance with an increase in temperature.

According to various embodiments, there is a method of making a device. The method can include providing a non-metallic binder material, forming a composite member by disposing one or more non-metallic, electrically conductive fibers in the non-metallic binder, and forming a plurality of contacts on the one or more non-metallic, electrically conductive fibers, wherein the composite member can have a substantially continuous decrease in electrical resistance with an increase in temperature.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1A:
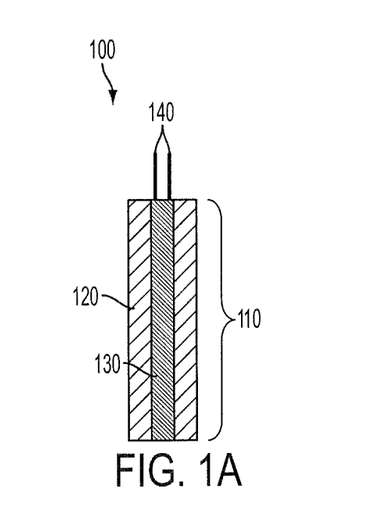
FIGS. 1A and 1B show a schematic illustration of an exemplary device, according to various embodiments of the present teachings.
Figure 1B:
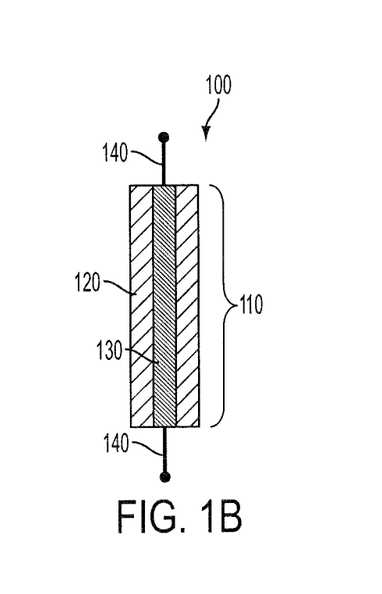
Figure 10:
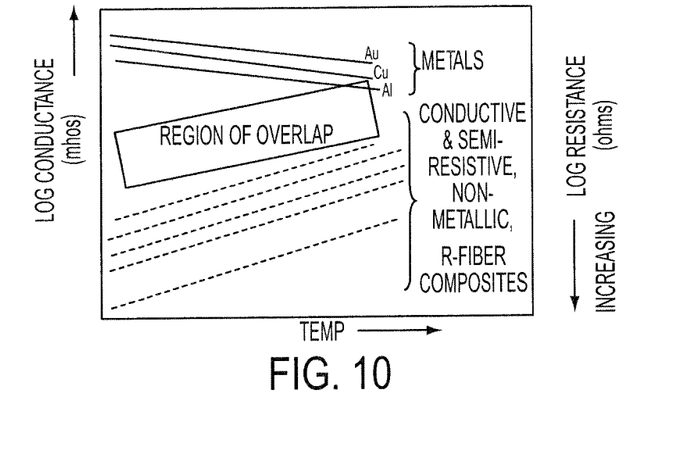
FIG. 10 shows conductance and resistance as a function of temperature of metals and exemplary composite members, in accordance with various embodiments of the present teachings.

FIGS. 1A and 1B each show a schematic illustration of a device 100, according to various embodiments of the present teachings. The device 100 can include a composite member 110, the composite member 110 including a non-metallic binder material 120 and one or more non-metallic, electrically conductive fibers 130 disposed in the non-metallic binder material 120. The device 100 can also include a plurality of contacts 140 disposed on the one or more non-metallic, electrically conductive fibers 130. In some embodiments, the plurality of contacts 140 can be disposed at one end as shown in FIG. 1A. In other embodiments, the plurality of contacts 140 can be disposed at opposite ends as shown in FIG. 1B. In various embodiments, the composite member 110 can have a substantially continuous decrease in electrical resistance with an increase in temperature, as shown in FIG. 10. In some embodiments, the device 100 can be used for temperature sensing. In other embodiments, the device 100 can be used for temperature control, which can include heating, cooling, or both heating and cooling to maintain a desired temperature. In some other embodiments, the device 100 can further include a plurality of composite members 110, wherein each of the plurality of composite members 110 can be used for either temperature sensing or temperature control, or for both temperature sensing and control. In some cases, the composite member 110 can have a substantially continuous decrease in electrical resistance with an increase in temperature in a time scale of less than about one second and in other cases in a time scale of less than about 100 milliseconds, and in some other cases in a time scale of less than about 50 millisecond. In some cases, the composite member can have a bulk resistivity in the range of about $10^{13}$ to about $10^{-5}$ ohm-cm and in other cases in the range of about $10^2$ to about $10^{-3}$ ohm-cm.

The composite member 110 can include any suitable material for each of the one or more non-metallic, electrically conductive fibers. Exemplary materials for each of the one or more non-metallic, electrically conductive fibers 130 can include, but are not limited to, partially carbonized polyacrylonitrile, fully carbonized polyacrylonitrile, carbonized pitch, carbon nanotube based fiber, nanotubular fibers made from boron nitride, silicon, and metal atom doped silicon. Conductive polyacrylonitrile (PAN) carbon fibers are commercially available from Hexcel Corp, Magna, Utah. Custom manufactured, resistive PAN carbon fibers can be supplied by MTLS Corporation, Alpharetta, Ga. Carbon nanotube based filaments and related yarns are produced by Nanocomp Technologies, Inc., Concord, N.H. In various embodiments, the composite member 110 can include any suitable non-metallic binder 120 material such as, for example, thermosetting polymers, including, but not limited to polyimide (PI), silicones; polyurethanes, and epoxy; thermoplastic polymers including, but not limited to, polyetherimide (PEI), polyethersulphone (PES), polyetheretherketone (PEEK); fluropolymers; fluroelastomers, such as Viton® (a product made by DuPont, Wilmington, Del.); and other materials which can serve as the non-metallic host or binder phase 120 of FIG. 1, such as; silica based glass; borosilicate glass; silica based ceramics; cements, including, but not limited to, calcium sulfoaluminate cement; and cermet. As used herein, the term "cermet" refers to a composite material composed of ceramic (cer) and metallic (met) materials. A cermet in general is designed to have the optimal properties of both a ceramic, such as high temperature resistance and hardness, and those of a metal, such as the ability to undergo plastic deformation and as a result can be most suitable binder material 120. While a cermet uses metal as part of its composition, when used as a binder for the ceramic such as, an oxide, boride, carbide, or alumina its composite properties often emulate the ceramic rather than the metal. Commonly used metals in cermets include, but are not limited to nickel, molybdenum, titanium, and cobalt. Depending on the physical structure of the material, cermets can also be metal matrix composites, but cermets are usually less than 20% metal by volume. Calcium aluminate cements can also be a binder 120 material of choice for high temperature sensing applications to enable real time temperature measurement and control in what generally can be a very difficult environment. Furthermore, because of the response time of the composite member 110, the sensor including calcium aluminate cement as the binder 120 material can enable faster diagnostics of potentially serious temperature departures by alerting a rapid temperature increase or decrease that can cause serious damage to a high temperature furnace.

Figure 2A:
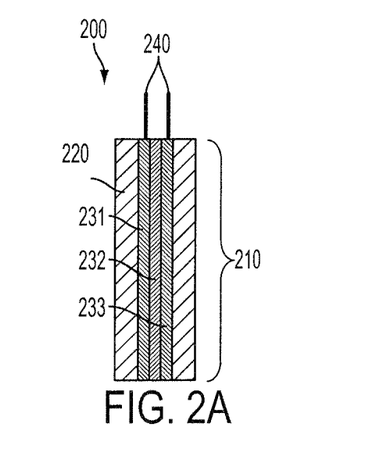
FIGS. 2A-2C show a schematic illustration of another exemplary device, according to various embodiments of the present teachings.
Figure 2B:
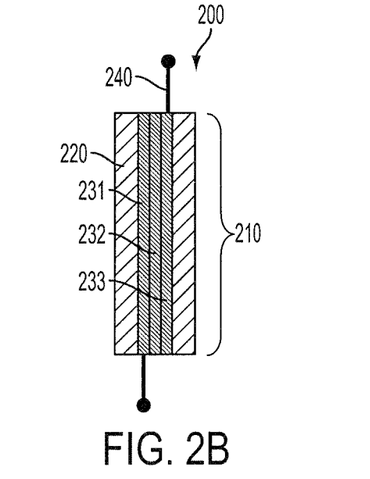
Figure 2C:
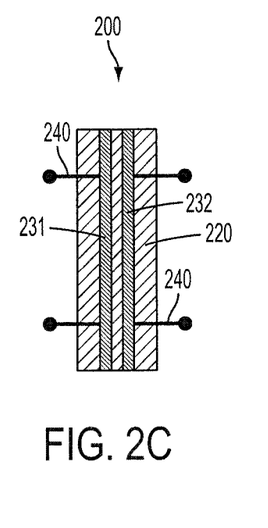
Figure 3:
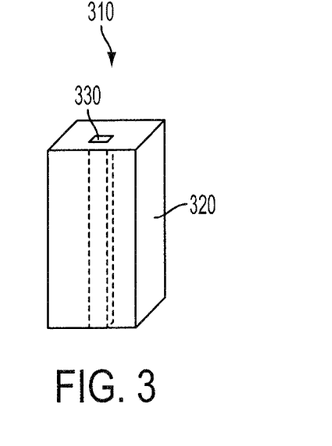
FIGS. 3-9 show schematic illustrations of exemplary composite member of the exemplary device shown in FIGS. 1 and 2, in accordance with various embodiments of the present teachings.
Figure 4:
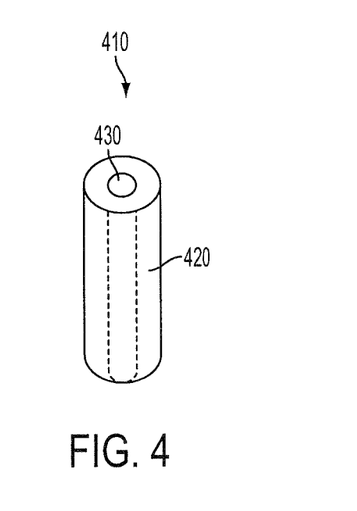
Figure 5:
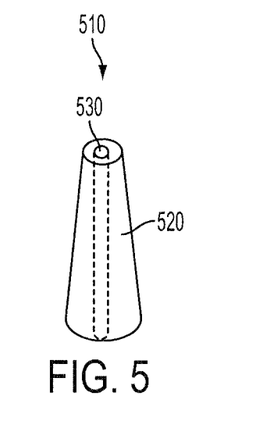
Figure 6:
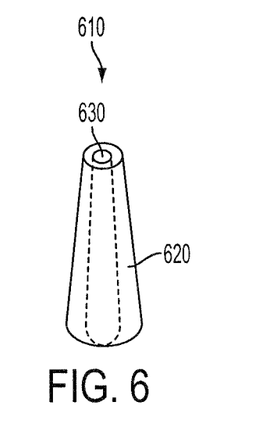
Figure 7:
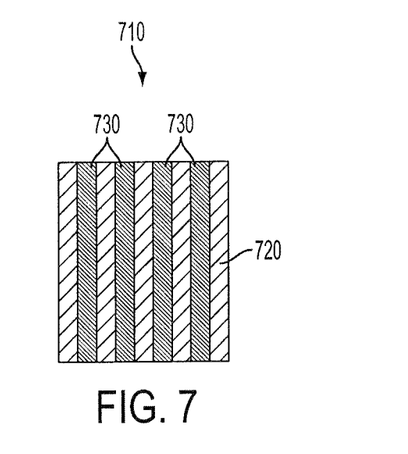
Figure 8:
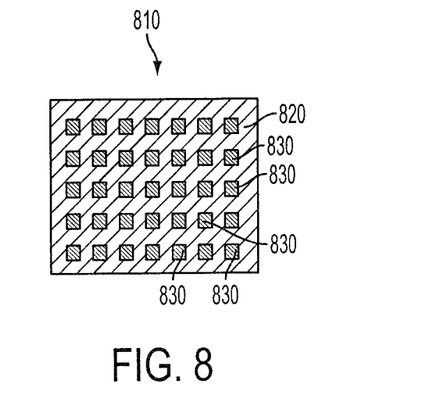
Figure 9:
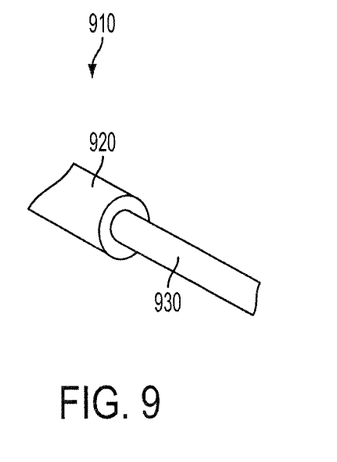

FIGS. 2A-2C each show another exemplary embodiment of the device 200. The device 200 can include a composite member 210 including a non-metallic binder material 220 and one or more non-metallic, electrically conductive fibers 231, 232, 233 disposed in the non-metallic binder material 220 and a plurality of contacts 240. In some embodiments, the plurality of contacts 240 can be disposed at one end as shown in FIG. 2A. In other embodiments, the plurality of contacts 240 can be disposed at opposite ends as shown in FIG. 2B. In some other embodiments, the plurality of contacts 240 can be disposed along the sides as shown in FIG. 2C. In some embodiments, at least one 232 of the one or more non-metallic, electrically conductive fibers 231, 232, 233 can be different from the rest 231, 233 of the one of the one or more non-metallic, electrically conductive fibers 231, 232, 233 with respect to composition or thickness, or both composition and thickness. While not intending to be bound by any specific theory, it is believed that the resistance and the rate of change of resistance as a function of temperature of the composite member 110, 210 can be controlled by one or more of the diameter of each fiber, the length of each fiber, a fiber to binder concentration ratio, composition of each of the one or more fibers, a composition of the non-metallic binder material, an area of the composite member, and a length of the composite member. In some embodiments, the composite member 110, 210 can be biocompatible, so that the device 100 can be used for temperature sensing for biological applications. In other embodiments, the composite member 110, 210 can be stable in a corrosive environment, such as, for example, elevated humidity and/or temperature, salt water, or in acidic or basic environments.

The composite member 110, 210 can be arranged in any suitable configuration such as, for example, a 2-dimensional or essentially a flat or very thin shaped object 110, 210; a 3-dimensional shaped object 310; a cylinder 410; a tapered cylinder 510, 610; a ribbon cable like structure 710; an array 810; a coaxial cable like structure 910; a bundle (not shown); a sheet (not shown); and a hollow body (not shown). In various embodiments, the ribbon cable like structure 710 and the coaxial cable like structure 910 can have two or more regions, wherein at least one of the two or more regions can have a resistivity different from the others. However any other configuration of the composite member 110, 210, 310, 410, 510, 610, 810 can have two or more regions, wherein at least one of the two or more regions can have an electrical resistivity different from the others. The composite member 110, 210, 310, 410, 510, 610, 710, 810, 910 can have any suitable dimensions ranging from nano size to macro size, with at least one dimension greater than about 5 nm. In some cases, the one or more non-metallic, electrically conductive fibers 130, 231, 232, 233, 330, 430, 530, 630, 730, 830, 930 can be present in an amount of from about 0.001 to about 99 percent by weight of the total solid weight of the composite member 110, 210, 310, 410, 510, 610, 710, 810, 910 and in other cases from about 10 to about 90 percent by weight of the total solid weight of the composite member 110, 210, 310, 410, 510, 610, 710, 810, 910. In certain embodiments, the composite member 110, 210, 310, 410, 510, 610, 710, 810, 910 can have a density in the range of about 1.0 to about 2.5 g/cm$^3$.

Referring back to FIG. 10, it shows a comparison of the thermo-conductance behavior of metals such as, aluminum, copper, and gold with the composite members 110, 210, 310, 410, 510, 610, 710, 810, 910 of the present disclosure. Specifically, three important distinctions exist between the thermo-conductance behavior of metals and the composite members 110, 210, 310, 410, 510, 610, 710, 810, 910. First, there is a region of overlap in the conductivity of metals and the composite members 110, 210, 310, 410, 510, 610, 710, 810, 910 where the some of the composite members 110, 210, 310, 410, 510, 610, 710, 810, 910 can have conductivity of the order of $10^{+3}$ mho-cm$^{-1}$ or roughly the conductivity of aluminum. The region of overlap in actuality is believed to be larger than that illustrated in FIG. 10, particularly when the one or more non-metallic, electrically conductive fibers 130 231, 232, 233, 330, 430, 530, 630, 730, 830, 930 include conductive carbon nanotubes in the compositions. Even so, the conductivity of the more conductive metals, such as copper, nickel, silver, gold, and the like may typically be about one or two orders of magnitude more conductive than the most conductive, non-metallic, composite members 110, 210, 310, 410, 510, 610, 710, 810, 910. Until this gap between metals and the composite members 110, 210, 310, 410, 510, 610, 710, 810, 910 is eliminated while at the same time preserving the NTC characteristic of the composite members 110, 210, 310, 410, 510, 610, 710, 810, 910, there will be certain applications, such as high power transmission, that may likely continue to be the exclusive domain for metals. However, for many other applications such as, for example, electronic level signal transmission and sensing; and temperature sensing and control, the composite members 110, 210, 310, 410, 510, 610, 710, 810, 910 show a technological advancement and functional benefit. Referring back to FIG. 10, second distinction that exists between the thermoelectric conductance behavior of metals and the composite members 110, 210, 310, 410, 510, 610, 710, 810, 910, is that metals typically exhibit PTC behavior while the composite members 110, 210, 310, 410, 510, 610, 710, 810, 910 exhibit NTC behavior Both PTC as well as NTC behavior may be suitable for use as temperature sensors and as thermistors, but NTC behavior may be preferred for certain applications such as, for example, moderate or low level power transmission but only with a suitable high conductivity composite member 110, 210, 310, 410, 510, 610, 710, 810, 910 with NTC-type behavior. The third distinction that exist between the thermoelectric conductance behavior of metals and the composite members 110, 210, 310, 410, 510, 610, 710, 810, 910, is that while the range of electrical conductivities for metals is rather narrow (for example, from about $10^{+3}$ to about $10^{+6}$ mho-cm$^{-1}$), the range of conductivities that one can achieve with the disclosed non-metallic compositions of the composite members 110, 210, 310, 410, 510, 610, 710, 810, 910 is very broad (for example, from about $10^{+3}$ to about $10^{-12}$ mho-cm$^{-1}$ or even greater). This range is significantly broader that the ranges provided by present commercially available thermistor materials.

In some embodiments, the composite member 110 can have a substantially linear decrease in electrical resistance with an increase in temperature. In other embodiments, the composite member can have a substantially continuous decrease in electrical resistance with an increase in temperature in a time scale of less than about one second.

EXAMPLES

Example 1

Preparation of a Composite Member

A composite member was made using a conventional pultrusion process to combine about 3,000 filament, polyacrylonitrile (PAN) based, resistive carbon fiber tow with a catalyzed EPON™ Resin 862 (Hexion Specialty Chemicals, Columbus, Ohio). As used herein, the term "tow" refers to an untwisted bundle of continuous fibers or filaments. The fiber-epoxy composite was then pultruded by a commercial pultrusion process (DFI, Hickory, N.C.) and at the same time the composite was being formed into a round shape it was cured at elevated temperatures in the range of about 100° C. to about 130° C. Upon solidification, a continuous length of about 100 ft of about 0.020 inch diameter rod was fabricated. The rod composite member was identified as lot no. 0.43-0.8T, where the 0.8T designates that the entire length of fiber tow had 0.8 turns per inch of twist. The twist was introduced along the length of the continuous filament (PAN based, resistive carbon fiber) tow prior to entry into the pultrusion process. A length of about 1 ft was then cut and post cured in a circulating air oven at about 200° C. for about 1 hour and cooled to room temperature.

Furthermore, shear strength of the composite member of Example 1 was determined to be in the range of about 21 MPa to about 36 MPa, which is equivalent to many metals and significantly stronger than most commercial thermistor materials.

Example 2

Resistance of the Composite Member of Example 1 as a Function of Temperature

Figure 11:
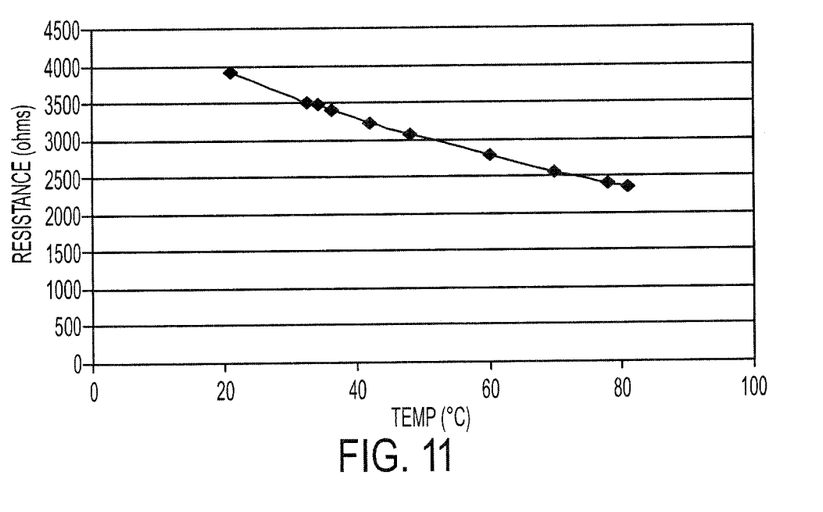
FIG. 11 shows resistance as a function of temperature of an exemplary composite member, in accordance with various embodiments of the present teachings.

The composite member of Example 1 was cut to about 14 cm in length and silver print (GC Electronics, Rockford, Ill.) electrodes were applied to each end of the composite member. The composite member was then mounted in a circulating air oven with appropriate wire hook up leads (contacts 140, as shown in FIG. 1) that were routed through a window in the wall of the oven to connect with a conventional ohmmeter. A commercial temperature monitor (of the thermocouple type) was used to set and monitor the oven temperature during the span of the experiment. The composite member was subjected to, and allowed to equilibrate at, temperatures that spanned the range of about 20° C. to about 80° C. in increments of about 5° C. to about 10° C. FIG. 11 shows resistance as a function of temperature of the composite member. It should be noted that the composite member showed a substantial change in resistance (delta of 1.58 kohms) over the temperature range studied (i.e. 60° C.), which equates to a slope of −25 ohms/° C. and a negative thermal coefficient (NTC).

Furthermore, regular observations of the response time of the above mentioned composite member were made and compared with that of the commercial thermocouple used to set and control the oven's temperature. At each of the approximately 100 points of comparison, the composite member's response time appeared to be instantaneous whereas that of the thermocouple was in the range of several to many seconds. Thus, an approximate estimate is that the response time of the composite member is at least 100 to 1000 times faster than the commercial thermocouple.

Example 3

Effect of Thermal Cycling on the Resistance of the Composite Member of Example 2

A thermal cycling test was conducted on the composite member of Example 2 by cycling the oven temperature up and down several times in the range of about 20° C. to about 80°

Figure 12:
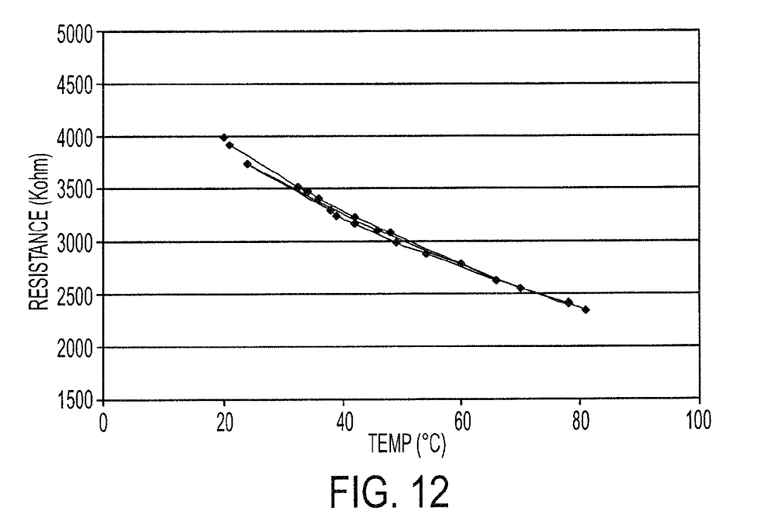
FIG. 12 shows effect of thermal cycling on the resistance as a function of temperature of an exemplary composite member, in accordance with various embodiments of the present teachings.

C. in increments of about 5° C. to about 10° C. and the resistance of the composite member was recorded. FIG. 12 shows the measured resistance as the temperature was cycled up and down over the 60° C. temperature window. The data reveals that the output is repeatable to within a precision of less than about ±1% with no significant hysteresis.

Example 4

Figure 13:
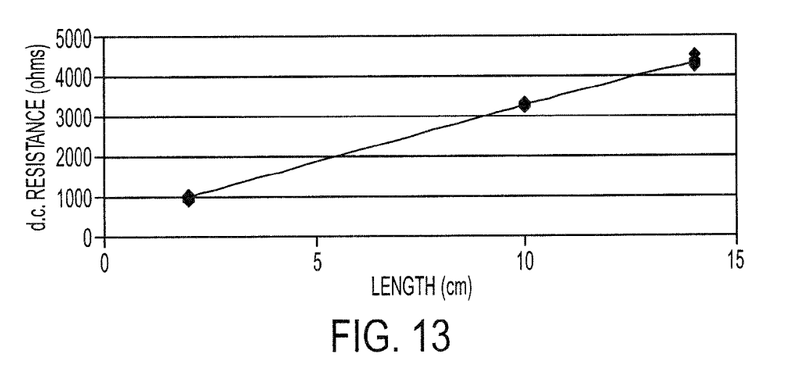
FIG. 13 shows resistance as a function of length of an exemplary composite member, in accordance with various embodiments of the present teachings.

Resistance of the Composite Member of Example 1 as a Function of Length of the Composite Member The composite member of Example 1 was cut into a 14 cm long sample, followed by applying silver print electrodes at a spacing of 10 cm and 2 cm and resistance measurements were made at these shorter spacing distances. A total of 12 measurements were taken at each length over a range of 0.1 to 8 VDC under conditions of constant temperature and humidity. FIG. 13 shows the measured resistance as a function of length or spacing. FIG. 13 clearly shows a linear relationship between resistance and the composite member length. Further, the composite member exhibited classical ohmic behavior over an operational range of applied voltages that any temperature sensor may be exposed.

The composite members of the present disclosure further exhibit three additional characteristics and/or behaviors. First, given that the composite members have a finite initial electrical resistance, it is possible to pass current through the composite members and by doing this achieve resistive heating. The level of heat generated is a function of the voltage applied and amount of current passing through the resistive composite member. Since, the composite members exhibit classical $I^2R$ type heating behavior, the composite members can be used for dual purposes, such as intermittent sensing and heating. Accordingly, the present teachings include a multifunctional device which can provide both sensing and heating-mode, temperature compensation. Second, since the non-metallic, electrically conductive filler fibers are typically manufactured and supplied in continuous lengths of many thousands of meters in length, long thin cross-sectional composite members can easily be manufactured and at very low cost by conventional wire making and pultrusion processes. Short lengths of the rod-like composite members can be cut from the longer lengths and easily fabricated into the short-length component sensors of the present disclosure, and, delivered at a very low cost. Furthermore, the identified manufacturing processes can be used to fabricate multiple stranded configurations where two or more conductive regions can be formed within the cross section of a single ribbon cable-like structure or coaxial cable-like structure. This makes it feasible to employ one (perhaps larger) conductive member for power or signal level transmission and the second affixed continuously thereto may be the thermally responsive member of the present disclosure to monitor (and perhaps control) the temperature of the transmission member. Third, the composite members of the present disclosure have very low mass (about 1.1 to 2.0 $g/cm^3$) in comparison to metals (about 6-8 $g/cm^3$) and unlike most metals are highly stable in corrosive environments.

According to various embodiments, there is a method of making a device. The method can include providing a non-metallic binder material, forming a composite member by disposing one or more non-metallic, electrically conductive fibers in the non-metallic binder and forming a plurality of contacts on the one or more non-metallic, electrically conductive fibers, wherein the composite member can have a substantially continuous decrease in electrical resistance with an increase in temperature. In some embodiments, the composite member can have a substantially linear decrease in electrical resistance with an increase in temperature. In some other embodiments, the composite member can have a substantially continuous decrease in electrical resistance with an increase in temperature in a time scale of less than about one second. In certain embodiments, the composite member can show a decrease in resistance per ° C. in the range of about 1 milliohms/° C. to about 100 megaohms/° C. In various embodiments, the step of forming a composite member by disposing one or more non-metallic, electrically conductive fibers in the non-metallic binder can further include providing at least one of the one or more non-metallic, electrically conductive fibers different from the rest of the one of the one or more non-metallic, electrically conductive fibers in terms of one or more of composition and thickness. In certain embodiments, the step of forming one or more composite members can include forming one or more composite members in a configuration selected from the group consisting of a 2-dimensional or essentially thin or flat shaped object, a 3-dimensional shaped object, an array, a bundle, a sheet, a cylinder, a tapered cylinder, a hollow body, a ribbon cable like structure, and a coaxial cable like structure. In some embodiments, the step of forming one or more composite members can further include forming two or more regions in the single ribbon cable like structure, and coaxial cable like structure such that each of the two regions has a resistivity different from the other. Any suitable technique can be used to form the one or more composite members, such as, for example, pultrusion, filament-winding, prepreg-forming, adhesive laminating, thermal laminating, injection molding, extrusion, coextrusion, inset molding, and injection blowing.

There are numerous uses envisioned for the invention disclosed including, but not limited to temperature sensing particularly where high sensitivity, fast response speed, and/or little or no impact to the sensing environment (non-interfering sensing) is required or where the environmental is highly corrosive and thereby adversely affects the performance or life of conventional devices. Temperature sensing where critical to the end application is the additional structural strength. Temperature compensation in, for example high precision measurement devices such as digital instruments' and high speed oscilloscopes' test probes used for in-situ electrical or other properties measurements requiring the highest level of precision. Another device is for those applications requiring many test probes to function in concert with each other, such as in certain "bed-of-nails" testers where any variation between probes due to any cause, particularly temperature variations amongst the probes, is unacceptable. In this case, the disclosed device including the composite members can be used to sense and compensate for any inter-probe variation by use of either external compensating electronics or by variable, and perhaps subtle, local heating of those probes that require appropriate in-situ compensation to enable all of the probes to have identical output resistance behaviors. Another area where devices including the composite members can be used is low to moderate power and signal level transmission owing to the fact that they exhibit both electrical conductivity and NTC behaviors which renders the composite members perhaps ideal substitutes for conventional metal wires in, for example fails-safe applications, corrosive and/or radiation rich environments. Additional uses for the exemplary devices includes: temperature sensing for biological applications where biocompatibility is paramount; integrated sensor nets where the composite member houses the combined sensor network structure and provides active temperature monitoring; and precision inexpensive active switching temperature control systems in combination with Ferro fluidic, or other liquids, gas, solid heat conduction, environmental or component control systems.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a temperature controller, comprising:
    forming a composite member, the composite member comprising:
        a non-metallic binder material that forms a substantially planar structure;
        a plurality of non-metallic, electrically conductive fibers disposed in the binder material, the plurality of fibers arranged in an array of regions extending transversely through the planar structure of the binder material, from a first side of the planar structure to a second side of the planar structure and continuously therebetween, wherein the first and second sides are substantially parallel; and
        a plurality of contacts disposed on the one or more non-metallic, electrically conductive fibers;
    twisting at least a portion of the composite member; and
    curing the composite member at a first temperature from about 100° C. to about 130° C. after the composite member is twisted; and
    post-curing the composite member at a second temperature of about 200° C. after the composite member is cured,
    wherein the composite member has a substantially continuous decrease in electrical resistance with an increase in temperature, and wherein the temperature controller is configured to control a temperature.

2. The method of claim 1, wherein the composite member has a substantially linear decrease in electrical resistance with an increase in temperature.

3. The method of claim 1, wherein the composite member has a substantially continuous decrease in electrical resistance with an increase in temperature in a time scale of less than about one second.

4. The method of claim 1, wherein the resistance and the rate of change of resistance as a function of temperature of the composite member is determined by one or more of size and area of one or more of the plurality of fibers, area of one or more of the plurality of fibers, length of one or more of the plurality of fibers, a fiber to binder concentration ratio, composition of each of the plurality of fibers, a composition of the binder material, an area of the composite member, and a length of the composite member.

5. The method of claim 1, wherein the composite member is at least one of biocompatible and stable in a corrosive environment.

6. The method of claim 1, wherein at least one of the parallel regions of electrically conductive fibers has a resistivity different from the others.

7. The method of claim 1, wherein the composite member has at least one dimension greater than about 5 nm.

8. The method of claim 1, wherein the composite member has a density in the range of about 1.0 to about 2.5 g/cm$^3$.

9. The method of claim 1, wherein each of the plurality of non-metallic, electrically conductive fibers is selected from the group consisting of partially carbonized polyacrylonitrile, fully carbonized polyacrylonitrile, carbonized pitch, carbon nanotube based fiber, nanotubular fibers made from boron nitride, silicon, and metal doped silicon.

10. The method of claim 1 wherein the device is configured to both sense a temperature and control a temperature.

11. The method of claim 1, wherein at least one of plurality of conductive fibers is different from the rest of the plurality of conductive fibers in composition, thickness, or both.

12. A method of making a temperature controller, comprising:
    forming a temperature sensor, wherein forming comprises:
        providing a non-metallic binder material that forms a substantially planar structure;
        forming a composite member by disposing a plurality of non-metallic, electrically conductive fibers in a plurality of regions extending transversely through the planar structure of the binder material, from a first side of the planar structure to a second side of the planar structure and continuously therebetween, wherein the first and second sides are substantially parallel, and wherein the plurality of fibers are twisted about a longitudinal axis through the composite member;
    twisting at least a portion of the composite member until the plurality of fibers have about 0.8 turns per inch;
    curing the composite member at a first temperature from about 100° C. to about 130° C. after at least a portion of the composite member is twisted,
    forming the composite member into a round cross-sectional shape at the same time as the composite member is cured to the first temperature;
    cutting the composite member into separate portions;
    post-curing the composite member in a circulating air oven at a second temperature of about 200° C. for about 1 hour after the composite member is cured, twisted, and cut;
    cooling the composite member to room temperature; and
    forming a plurality of contacts on the plurality of non-metallic, electrically conductive fibers,
        wherein the composite member has a shear strength from about 21 MPa to about 36 MPa, wherein the composite member has a substantially continuous decrease in electrical resistance with an increase in temperature, and the temperature controller is configured to control a temperature.

13. The method of claim 12, wherein the composite member has a substantially linear decrease in electrical resistance with an increase in temperature.

14. The method of claim 12, wherein the composite member has a substantially continuous decrease in electrical resistance with an increase in temperature in a time scale of less than about one second.

15. The method of claim 12, wherein the composite member shows a decrease in resistance per ° C. in the range of about 1 milliohms/° C. to about 100 megaohms/° C.

16. The method of claim 12, wherein the composite member has a resistivity in the range of about $10^2$ to about $10^{-3}$ ohm-cm.

17. The method of claim 12, wherein the resistance and the rate of change of resistance as a function of temperature of the composite member is determined by one or more of a fiber to binder concentration ratio, composition of each of the plurality of fibers, a composition of the binder material, an area of the composite member, and a length of the composite member.

18. The method of claim 12, wherein forming a composite member comprises disposing one or more non-metallic, electrically conductive fibers selected from the group consisting of partially carbonized polyacrylonitrile, fully carbonized polyacrylonitrile, carbonized pitch, carbon nanotube based fiber, nanotubular fibers made from boron nitride, silicon, and metal doped silicon in the binder material.

19. The method of claim 12, further comprising configuring the temperature controller to both sense a temperature and control a temperature.

20. The method of claim 12, wherein at least one of the plurality of conductive fibers is different from the rest of the plurality of conductive fibers in composition, thickness, or both.

21. The method of claim 1, wherein the plurality of regions are separated from one another by the binder material.

22. The method of claim 12, wherein the plurality of regions are separated from one another by the binder material.

* * * * *